(12) United States Patent
Wang et al.

(10) Patent No.: US 9,356,838 B1
(45) Date of Patent: May 31, 2016

(54) SYSTEMS AND METHODS FOR DETERMINING NETWORK FORWARDING PATHS WITH A CONTROLLER

(71) Applicant: Big Switch Networks, Inc., Mountain View, CA (US)

(72) Inventors: Kuang-Ching Wang, Central, SC (US); Srinivasan Ramasubramanian, Redwood City, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 309 days.

(21) Appl. No.: 13/843,138

(22) Filed: Mar. 15, 2013

(51) Int. Cl.
*H04L 12/28* (2006.01)
*H04L 12/24* (2006.01)

(52) U.S. Cl.
CPC ....................................... *H04L 41/12* (2013.01)

(58) Field of Classification Search
USPC ......... 370/238, 235, 389, 392, 256, 221, 225, 370/401, 252, 400, 217, 248, 254; 709/241, 709/203, 220, 223
See application file for complete search history.

(56) References Cited

U.S. PATENT DOCUMENTS

| | | | |
|---|---|---|---|
| 6,654,914 | B1 | 11/2003 | Kaffine et al. |
| 2008/0181133 | A1* | 7/2008 | Thubert et al. ................ 370/255 |
| 2012/0320768 | A1 | 12/2012 | Shaffer et al. |
| 2013/0121331 | A1 | 5/2013 | Vasseur et al. |
| 2013/0223444 | A1* | 8/2013 | Liljenstolpe et al. ......... 370/392 |
| 2013/0329601 | A1* | 12/2013 | Yin et al. ...................... 370/254 |

OTHER PUBLICATIONS

Lappetelainen, "Equal Cost Multipath Routing in IP Networks", Faculty of Electronics, Communications and Automation, Mar. 17, 2013, pp. 12-85, AALTO University, School of Science and Technology.

* cited by examiner

*Primary Examiner* — Phuongchau Ba Nguyen
(74) *Attorney, Agent, or Firm* — Treyz Law Group, P.C.; Michael H. Lyons

(57) ABSTRACT

A controller may control switches in a network that forwards network packets between end hosts. The controller may generate a directed acyclic graph based on maintained network topology information. The directed acyclic graph may include multiple network paths between any given pair of switches. For a given network packet received from an end host, the controller may generate an identifier or otherwise classify the network packet based on network attributes of the network packet. The network attributes may include packet header information retrieved from the network packet, information maintained by the controller such as which virtual switch is associated with the network packet, and/or other network attributes. The controller may use the network packet identifier to select a network forwarding path for the network packet from the directed acyclic graph.

18 Claims, 18 Drawing Sheets

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ⋮ | SEND TO PORT 4 |
| * | * | * | * | * | * | 80 | | DROP |

FIG. 6B
(PRIOR ART)

SYSTEMS AND METHODS FOR DETERMINING NETWORK FORWARDING PATHS WITH A CONTROLLER

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Conventional switches in a network (e.g., switches that do not have controller clients and do not communicate with the controller) communicate with other switches to make localized decisions on how to forward network traffic between end hosts. In some scenarios, the switches converge on a tree structure in which only one forwarding path is used for each pair of nodes in the tree. However, use of tree structures can lead to inefficient use of available network resources, as the network links and devices of the tree structures are burdened with a disproportionate amount of network traffic.

In some scenarios, a network forwarding device such as a router can partition network traffic that is forwarded by the network forwarding device among multiple ports of the network forwarding device. However, such localized decisions may lead to suboptimal packet forwarding by the network. For example, individual network forwarding devices can partition network traffic independently, which can lead to network packets that arrive out-of-order at destinations (e.g., due to differences in latency between network paths).

SUMMARY

A controller may be used to control switches in a network. The controller may receive network packets from the switches and generate network forwarding paths through the switches for the network packets based on network topology information maintained at the controller. The network packets may be sent from source to destination end hosts that are coupled to respective source and destination switches. For a given network packet, the controller may generate an identifier or otherwise classify the network packet based on network attributes of the network packet. The network attributes may include packet header information retrieved from the network packet, information maintained by the controller such as which virtual switch (e.g., a virtual switch formed from a group of end hosts) is associated with the network packet, and/or other network attributes. The controller may use the network packet identifier to determine a network forwarding path for the network packet.

The controller may generate a directed acyclic graph based on maintained network topology information. The directed acyclic graph may include nodes corresponding to switches and includes directed edges between the nodes. The directed acyclic graph may include multiple network forwarding paths between any given pair of nodes (e.g., between first and second switches). For example, the controller may generate the directed acyclic graph to include all minimum-cost forwarding paths between any pairs of nodes in the directed acyclic graph. The controller may assign indices to each network forwarding path between a given pair of nodes. An identifier generated from a network packet may be matched to the indices of the network forwarding paths to determine which network forwarding path should be generated for the network packet.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on flow table entries of the flow table in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
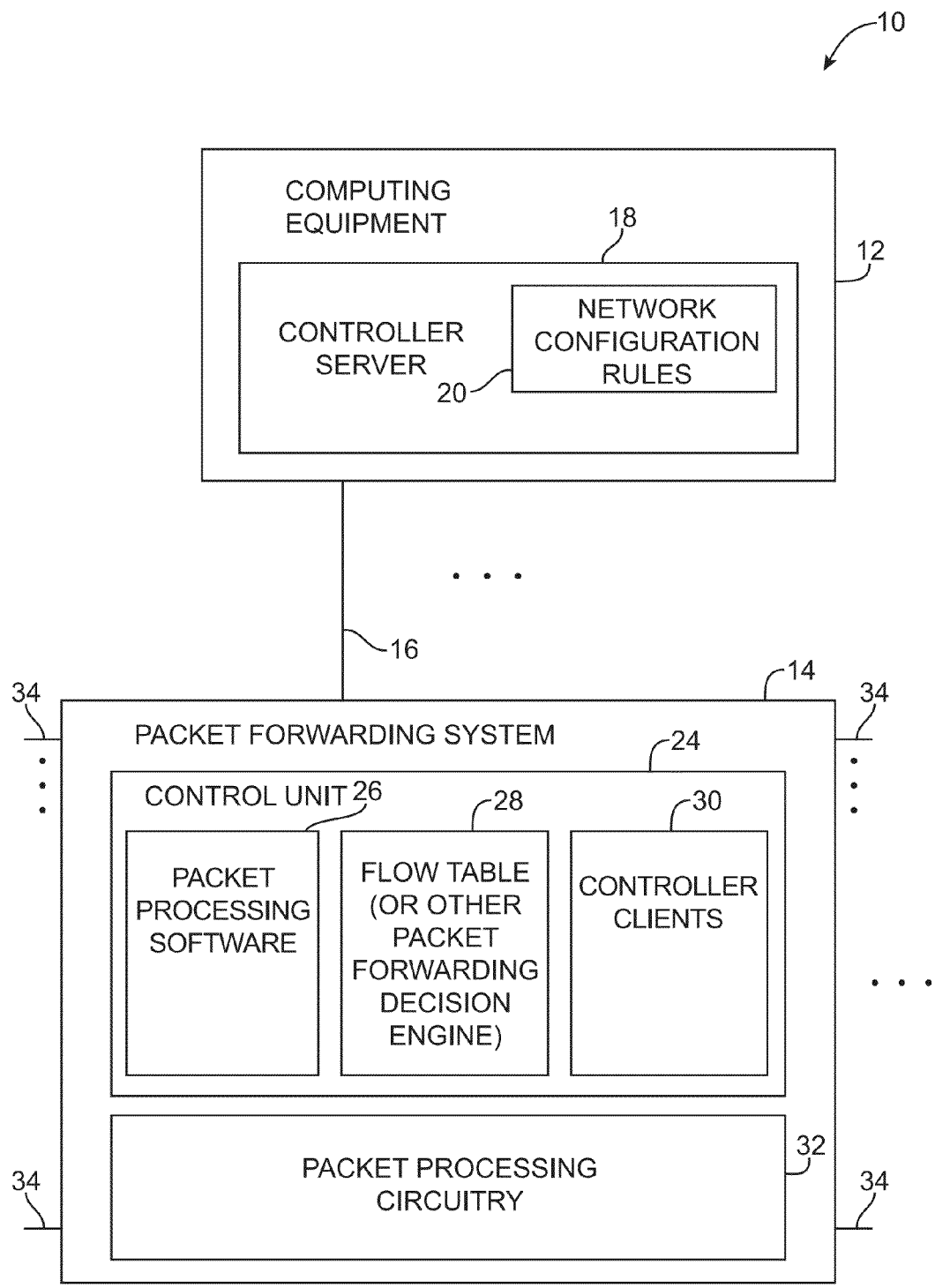
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits. (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwardinq system 14 to forward network packets to predetermined ports based on attributes of the network packets (e.g., based on network protocol headers).

Figure 2:
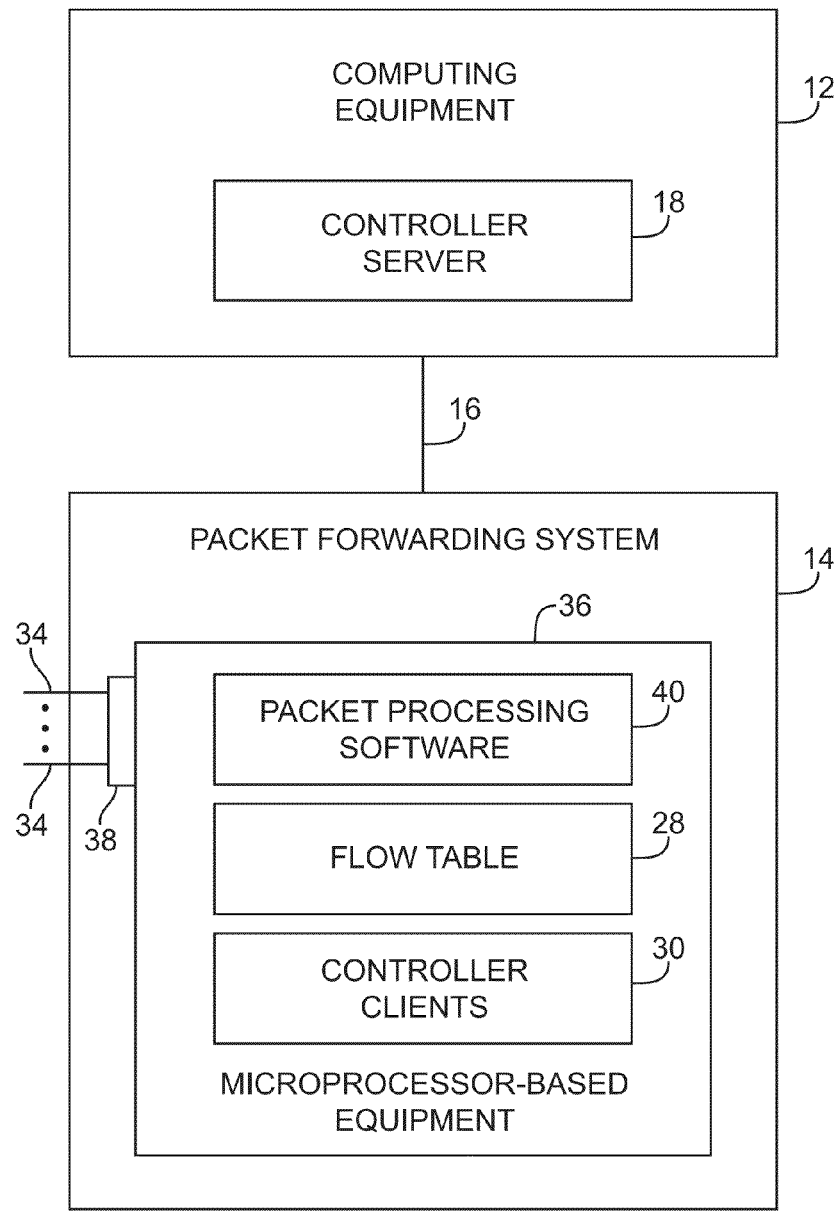
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
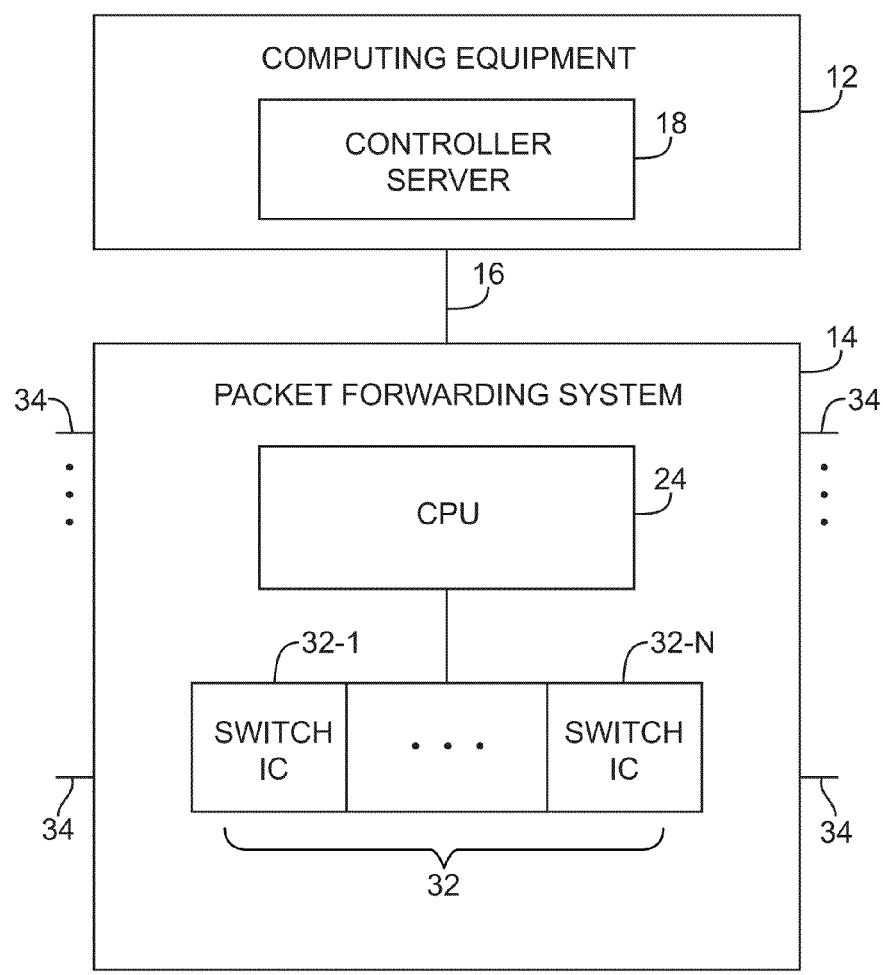
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
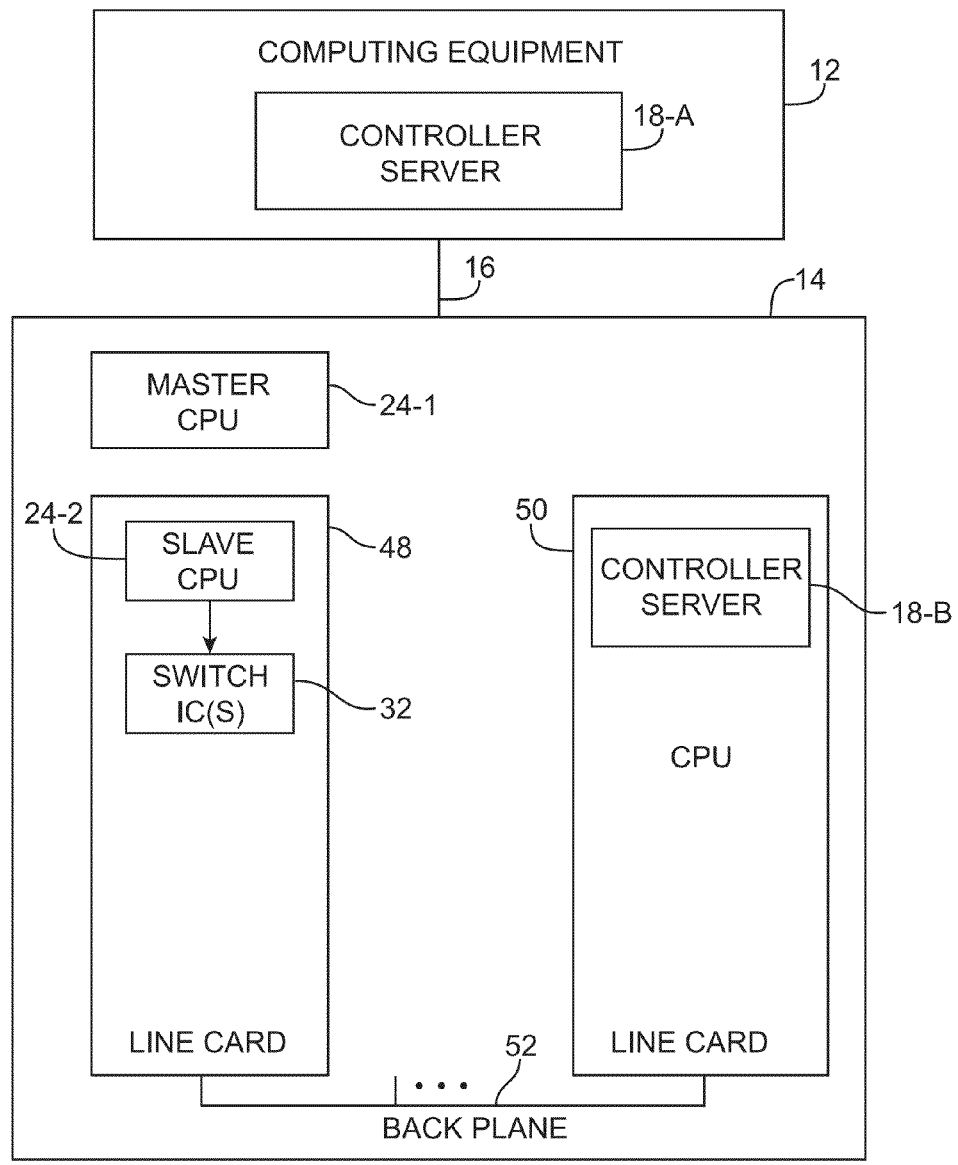
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
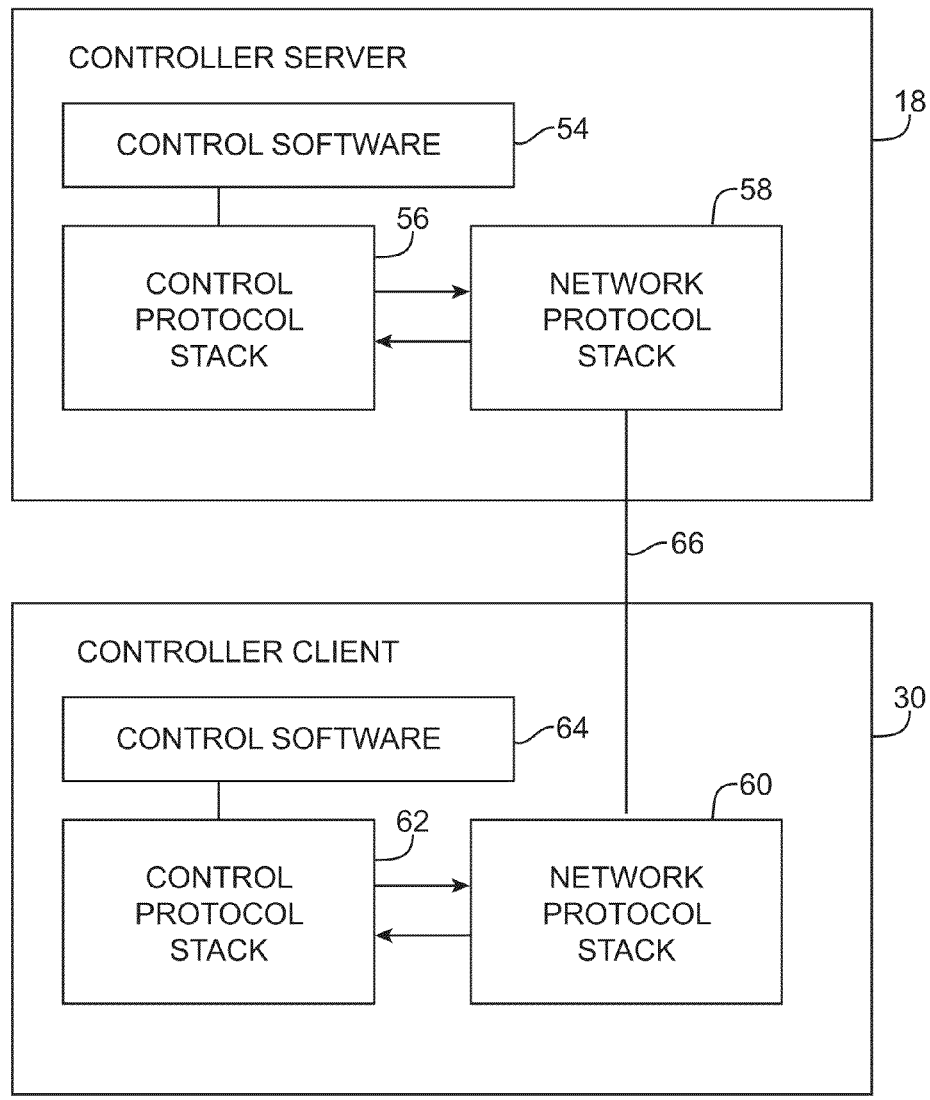
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for examole Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
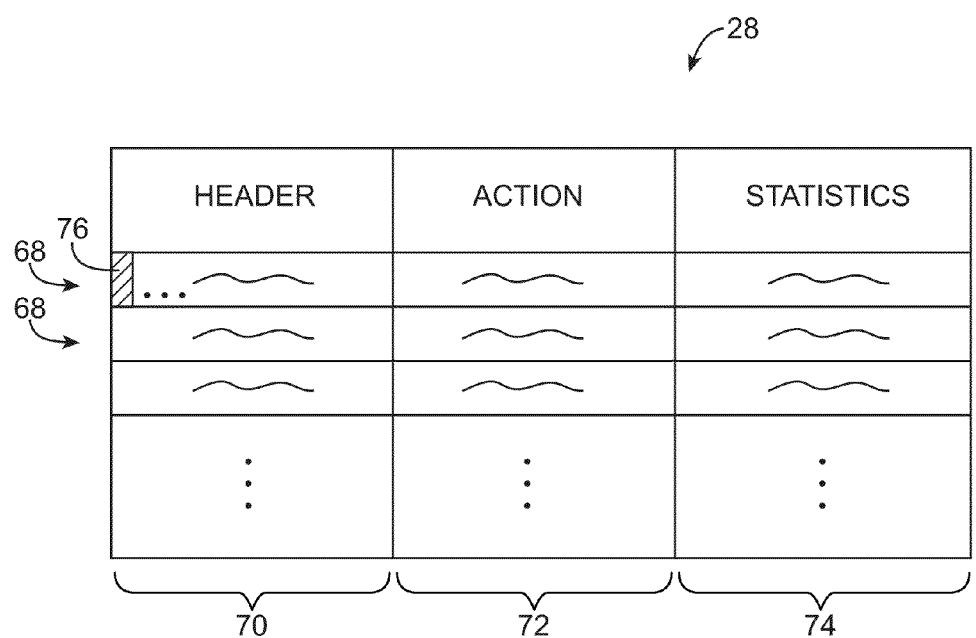
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network. The network attributes used in the example of FIG. 6B are merely illustrative. Any desired set of network attributes such as protocol ports, network addresses, physical ports, etc. may be used in a flow table entry to match to network packets.

Figure 7:
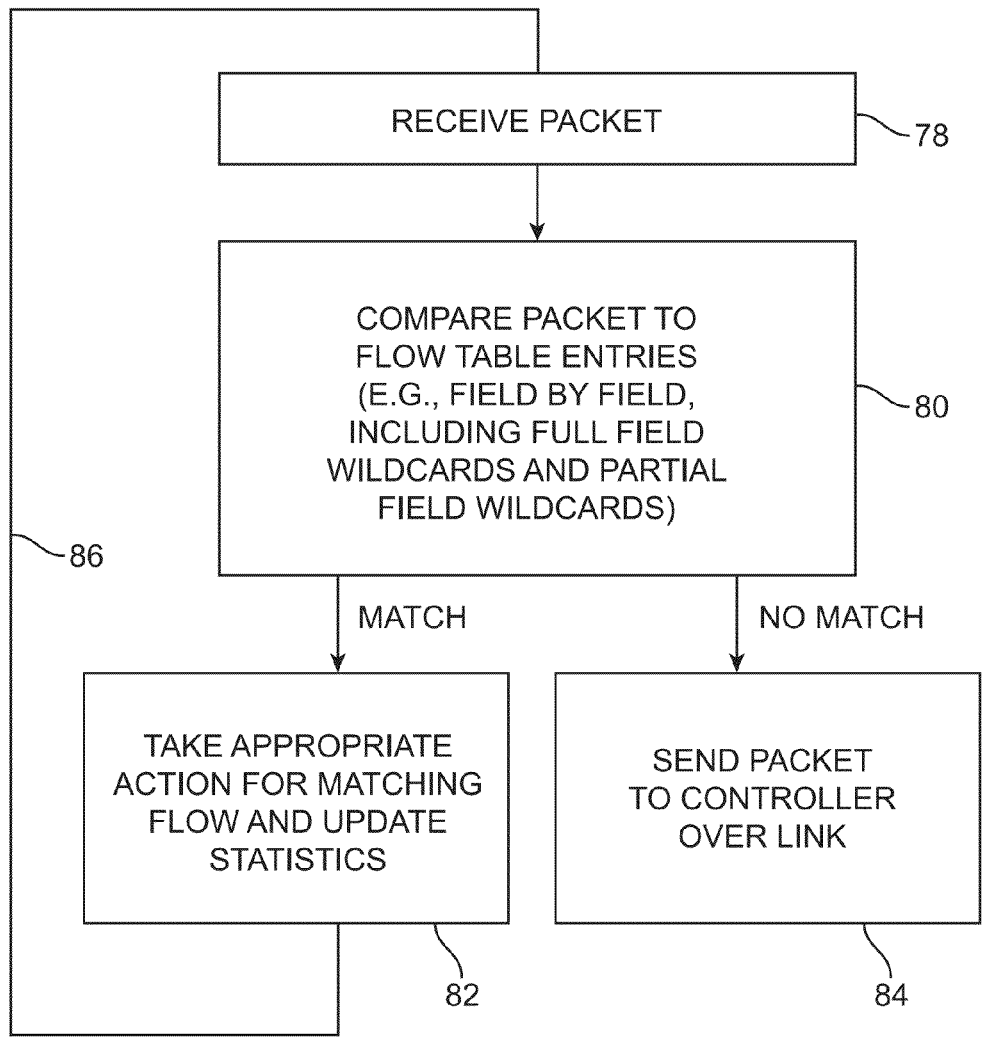
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
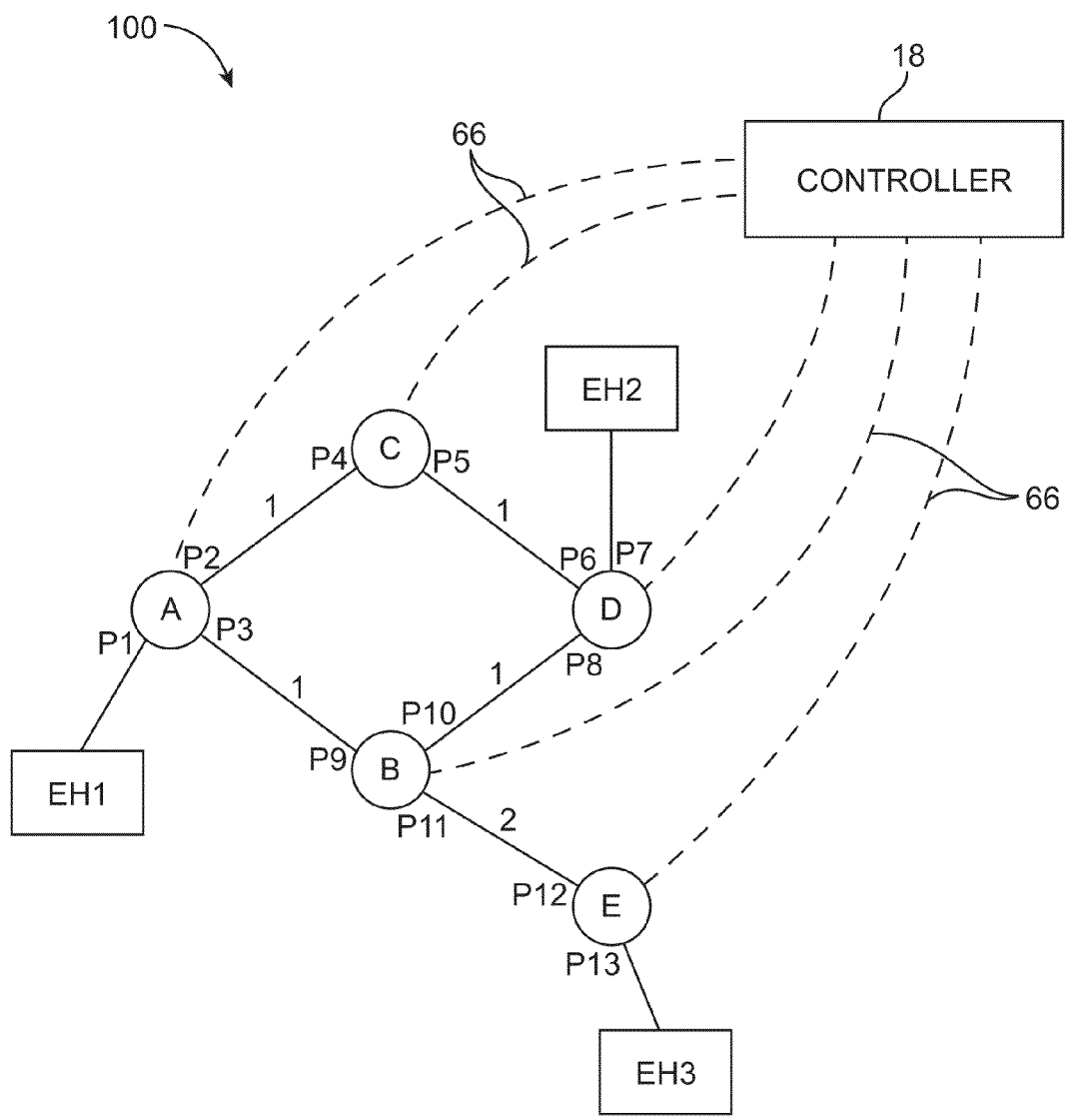
FIG. 8 is a diagram of an illustrative network in which a controller may control switches and generate network forwarding paths in accordance with an embodiment of the present invention.

Controllers such as controller 18 may be configured to identify and generate network forwarding paths for packets received at the switches. For example, a switch may forward a network packet to the controller for which no matching flow table entries have yet been provided (e.g., during step 84). The controller may then use network topology information maintained at the controller to identify an appropriate path for the network packet. FIG. 8 is an illustrative diagram of a network 100 in which controller 18 may generate network forwarding paths based on network topology information maintained by controller 18.

As shown in FIG. 8, network 100 may include switches such as switches A, B, C, D, and E (or other packet forwarding devices). Network 100 may include end hosts such as end hosts EH1, EH2, and EH3 that are coupled to the switches. End host EH1 may be coupled to switch A, end host EH2 may be coupled to switch D, and end host EH3 may be coupled to switch E. The switches may include ports to which other switches and/or end hosts are coupled. In the example of FIG. 8, switch A may include ports P1, P2, and P3, switch C may include ports P4 and P5, switch D may include ports P6, P7, and P8, switch B may include ports P9, P10, and P11, and switch E may include ports P12 and P13. End host EH1 may be coupled to switch A at port P1, port P2 of switch A may be coupled to port P4 of switch C, port P3 of switch A may be coupled to port P9 of switch B, etc.

The switches may communicate with controller 18 via control paths 66 (e.g., the switches may include controller clients that are controlled by controller 18 via control paths 66). Switches that include controller clients may sometimes be referred to herein as client switches. If desired, network 100 may optionally include non-client switches that do not include controller clients and are not controlled by controller 18.

The example of FIG. 8 in which network 100 includes five switches and three end hosts is merely illustrative. If desired, network 100 may include any desired number of switches that are coupled to any desired number of end hosts for which controller 18 may maintain network topology information.

Controller 18 may communicate with client switches to identify the topology of network 100. For example, controller 18 may direct the switches to send controller-generated network packets such as LLDP packets that are received by other switches that subsequently forward the controller-generated network packets to the controller along with additional information such as information identifying which port of the switch received the network packet. In this scenario, controller 18 may determine the network topology based on the controller-generated packet (e.g., identifying a network link between the original switch to which the controller-generated packet was sent and the switch that received the controller-generated packet).

Controller 18 may determine a cost metric for each network link of the network topology. In the example of FIG. 8, the network link between switches A and B, between switches A and C, between switches C and D, and between switches B and D may have respective cost metrics of one, whereas the link between port P11 of switch B and port P12 of switch E may have a cost of two. The cost metrics may be generated based on any desired cost metric such as latency, bandwidth, switch capabilities, etc.

Figure 9:
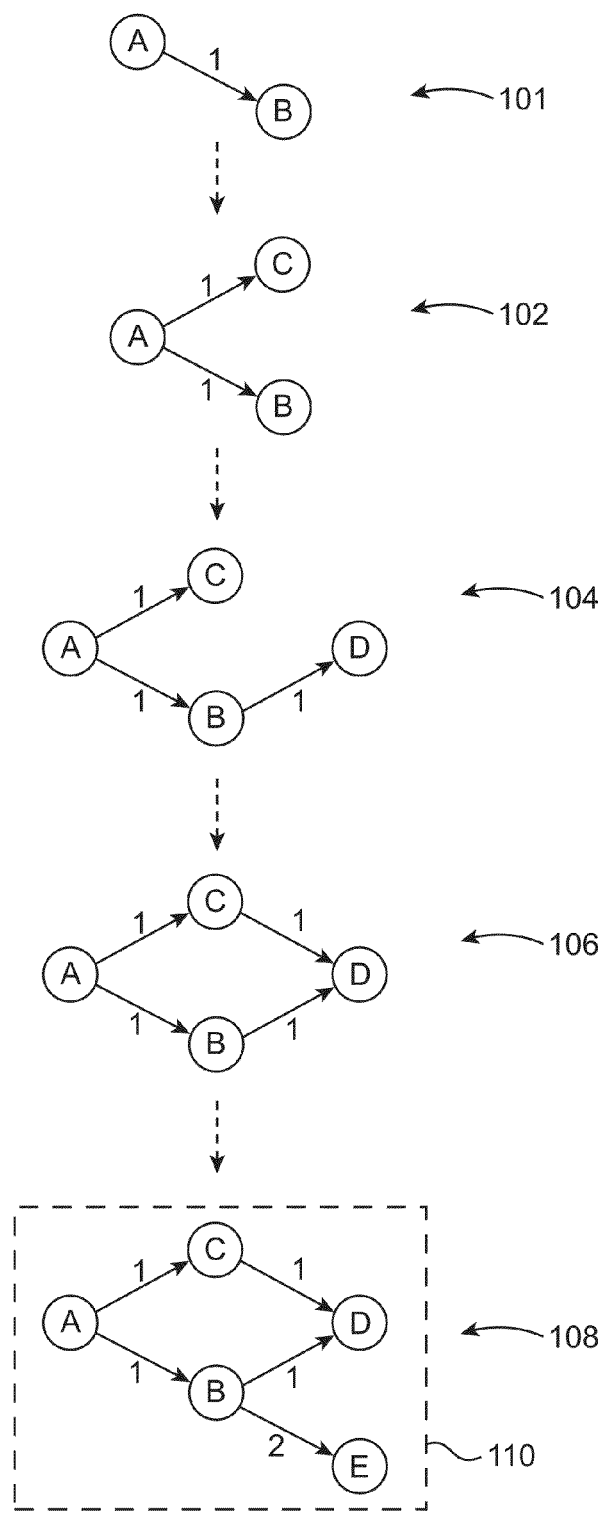
FIG. 9 is a diagram of illustrative steps that may be performed by a controller to generate a directed acyclic graph (DAG) in accordance with an embodiment of the present invention.

Network 100 may include multiple network paths that connect any pair of nodes in the network topology (e.g., nodes such as switches, end hosts, or other network devices). For example, two forwarding paths exist between switch A and switch D. A first path may traverse switch C, whereas a second path may traverse switch B. Controller 18 may be configured to store multiple forwarding paths between nodes for future use (e.g., in generating network forwarding paths for network packets). FIG. 9 is a diagram of illustrative steps that may be performed by controller 18 in processing network topology information to identify forwarding paths between switch A and other nodes in the network topology of network 100.

During initial step 101, controller 18 may select switch A and select a node that is linked to switch A by a lowest cost link (i.e., a minimum-cost link). For network 100 of FIG. 8, the lowest cost link may have a cost of one (e.g., the link between switch A and switch B or the link between switch A and switch C). In the example of FIG. 9, controller 18 may select switch B and identify a directed edge from switch A to switch B.

During subsequent step 102, controller 18 may select a lowest cost path from the remaining links. The lowest cost path may represent a network forwarding path between the source node (switch A) and another node. The cost of any given path may include multiple links. For example, the cost of a path from switch A to switch D through switch B may be two (i.e., the sum of the link between switches A and B and the link between switches B and D). In the example of FIG. 9, the lowest cost remaining path at step 102 may be the link between switch A and switch C. Controller 18 may therefore select switch C and identify a directed edge from switch A to switch C.

During step 104, controller 18 may select the next lowest cost path from the remaining links of the network topology. Controller 18 may select a path from source switch A to switch D that traverses switch B. Based on the network topology cost metrics, the selected path may have a cost of two, which represents the lowest cost path from the remaining links of the network topology given the partially formed graph from previous step 102.

Controller 18 may identify multiple paths between the source node (switch A) and any other node in the network topology. For example, controller 18 may identify all potential paths between the source node and any other node that share the same lowest-cost value. During step 106, controller 18 may determine that a path from source switch A to switch D that traverses switch C has a cost of two, which is the same cost as the lowest-cost path traversing switch B as determined in previous step 104. During subsequent step 108, controller 18 may identify a lowest-cost path from source switch A to switch E through switch B.

By performing the operations of steps 101-108, controller 18 may generate a directed acyclic graph 110 for selected switch A. The directed acyclic graph includes directed edges that do not form any loops (e.g., it may not be possible to traverse the directed edges from a starting node in such a way as to return to the starting node). The directed acyclic graph may be used to identify and generate forwarding paths for network packets that are destined for selected switch A (e.g., in reverse direction of the directed edges). Consider the scenario in which a network packet that is destined for end host EH1 is received at switch E (e.g., from end host EH3). In this scenario, controller 18 may generate a network forwarding path for the network packet based on the directed acyclic graph. The generated network forwarding path may traverse switches B and A.

Figure 10:
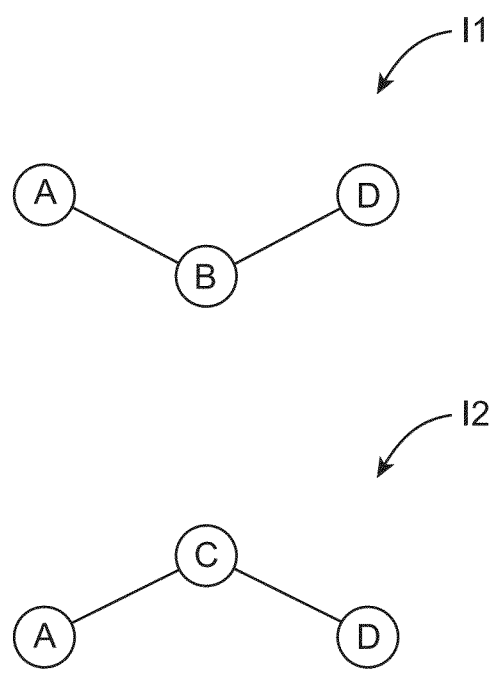
FIG. 10 is a diagram showing how a directed acyclic graph may include multiple paths between a given pair of nodes in accordance with an embodiment of the present invention.

In scenarios such as when a directed acyclic graph that has been generated by controller 18 includes multiple paths between a given pair of nodes, controller 18 may assign an identifier to each of the paths between the given pair of nodes. As shown in FIG. 10, directed acyclic graph 110 may include a first path between switch A and switch D that traverses switch B and a second path between switches A and D that includes switch C. The first and second paths may be assigned respective identifiers I1 and I2. The cost metric of each path may be the same or, if desired, may be different (e.g., depending on how the directed acyclic graph is generated).

Controller 18 may generate a directed acyclic graph such as graph 110 for each switch in network 100. In other words, controller 18 may use each switch as a source node (source switch) in generating a corresponding directed acyclic graph. Each directed acyclic graph may be used to determine forwarding paths for network packets that are destined for the source switch. For example, controller 18 may receive a network packet that is destined for end host EH1 from switch D. In this scenario, controller 18 may use directed acyclic graph 110 of FIG. 9 to determine that paths I1 and I2 are available for the network packet. Controller 18 may select one of paths I1 and I2 and generate the selected forwarding path so that the network packet is forwarded from switch D to switch A and end host EH1.

Figure 11:
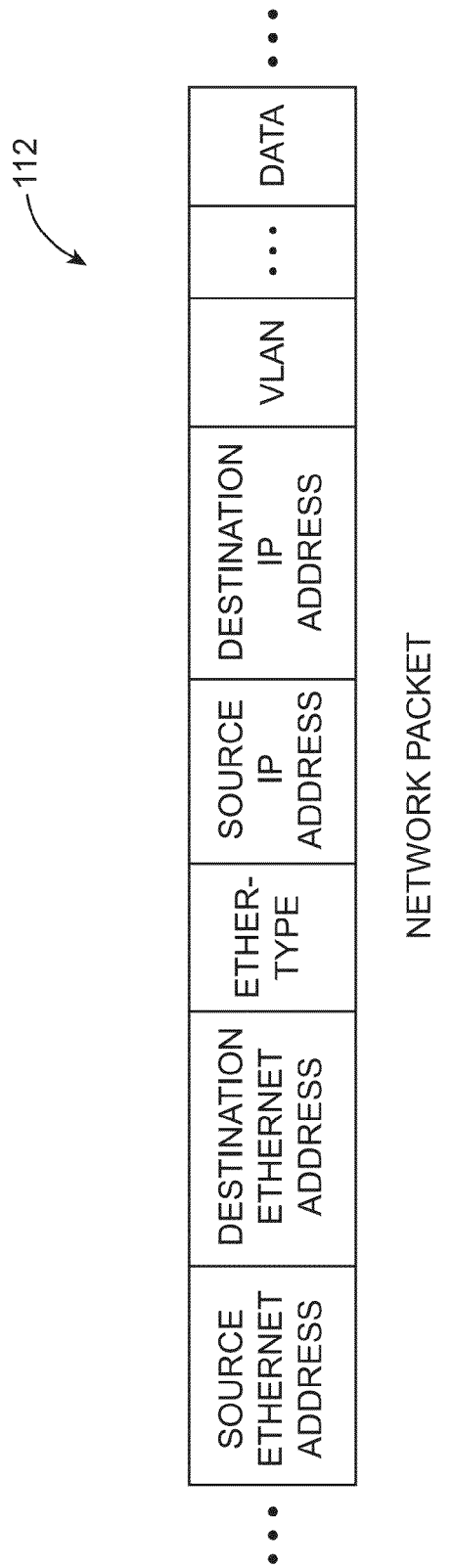
FIG. 11 is a diagram of an illustrative network packet having associated network attributes in accordance with an embodiment of the present invention.

Controller 18 may determine forwarding paths for network packets based on network attributes associated with the packets. Controller 18 may identify network attributes of a network packet based on header fields of the network packet. FIG. 11 is a diagram of an illustrative network packet that includes header fields. Network packet 112 may be sent from a source end host to a destination end host.

As shown in FIG. 11, network packet 112 may include an Ethertype, a source Ethernet address, a destination Ethernet address, a source internet protocol (IP) address, a destination IP address, and a virtual local area network (VLAN) identifier stored in header fields of network packet 112. Network packet 112 may include data to be forwarded from the source end host to the destination end host through the network.

The Ethertype may identify the type of network protocol used to encapsulate information in the data field of the network packet. For example, the Ethertype may identify that the data field includes information encapsulated using the Internet Protocol, the Link Layer Discovery Protocol, or other protocols such as broadcast discovery protocols.

The source IP address and source Ethernet address of network packet 112 may correspond to addresses associated with the source end host, whereas the destination IP address and destination Ethernet address may correspond to addresses associated with the destination end host. The VLAN identifier may identify a virtual local area network that is associated with the source end host. If desired, network packet 112 may include any desired combination of network attributes shown in FIG. 11 (e.g., information stored in network packet header fields) or may include additional header fields associated with network protocols (e.g., IP header fields, Ethernet header fields, etc.).

In some scenarios, controller 18 may identify network attributes associated with the network packet based on information provided by a switch. For example, during step 84 of FIG. 7, a switch may forward a network packet to the controller along with information identifying which port of the switch received the network packet. The identified switch port may be used by the controller in determining an appropriate network forwarding path for the network packet (e.g., in generating an identifier for the network packet that is used to select an appropriate network forwarding path).

Figure 12:
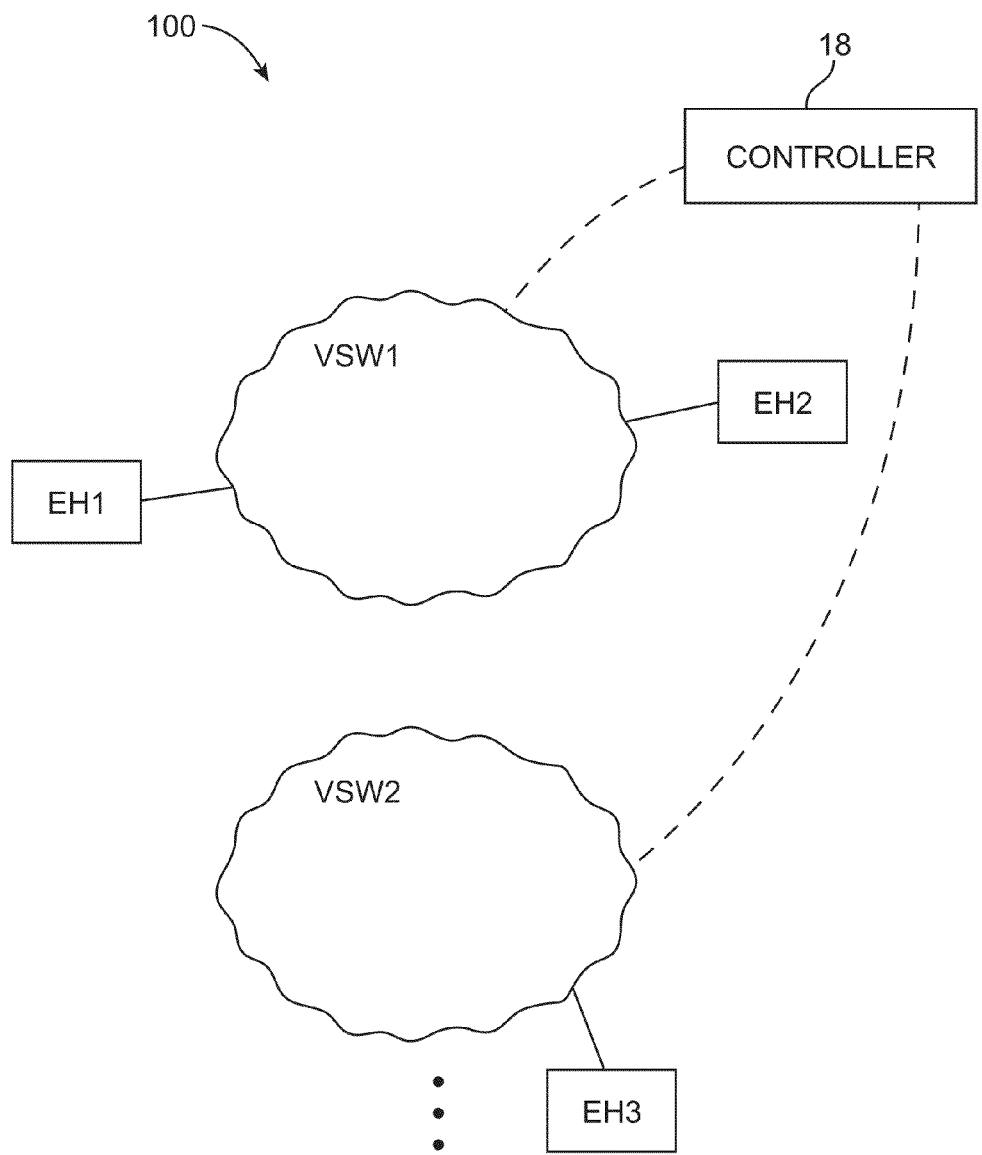
FIG. 12 is a diagram of virtual switches that may be generated by a controller in accordance with an embodiment of the present invention.

Controller 18 may, if desired, maintain virtual switches formed from groups of end hosts. FIG. 12 is a diagram of illustrative virtual switches that may be formed from groups of end hosts in network 100. In the example of FIG. 12, virtual switch VSW1 may include end hosts EH1 and EH2, whereas virtual switch VSW2 may include end host EH3. Virtual switches may be used in implementing network policy and forwarding decisions. For example, the controller may implement a network policy that restricts network traffic flows between virtual switches.

Controller 18 may maintain virtual switches such as virtual switches VSW1 and VSW2 by controlling the underlying physical switches to identify which network packets belong to each virtual switch. For example, network packets received from end hosts EH1 and EH2 may be assigned to virtual switch VSW1, whereas network packets received from end host EH3 may be assigned to virtual switch VSH2.

An end host may be identified by the switch port to which the end host is attached. In this scenario, the controller may assign network packets that are received at the identified switch port to the virtual switch to which the corresponding end host belongs (e.g., network packets received at port P1 of switch A may belong to virtual switch VSW1, because end host EH1 belongs to virtual switch VSW1). This example is merely illustrative. End hosts may be identified based on any desired network attribute or combination of network attributes that describe the end hosts. For example, end hosts may be identified based on network addresses such as Ethernet addresses and/or other network attributes such as network attachment points (e.g., a switch port). Virtual switches may include physical ports from multiple physical switches. For example, virtual switch VSW1 may include physical port P1 of switch A and physical port P7 of switch D, whereas virtual switch VSW1 may include physical port P13 of switch E.

Figure 13:
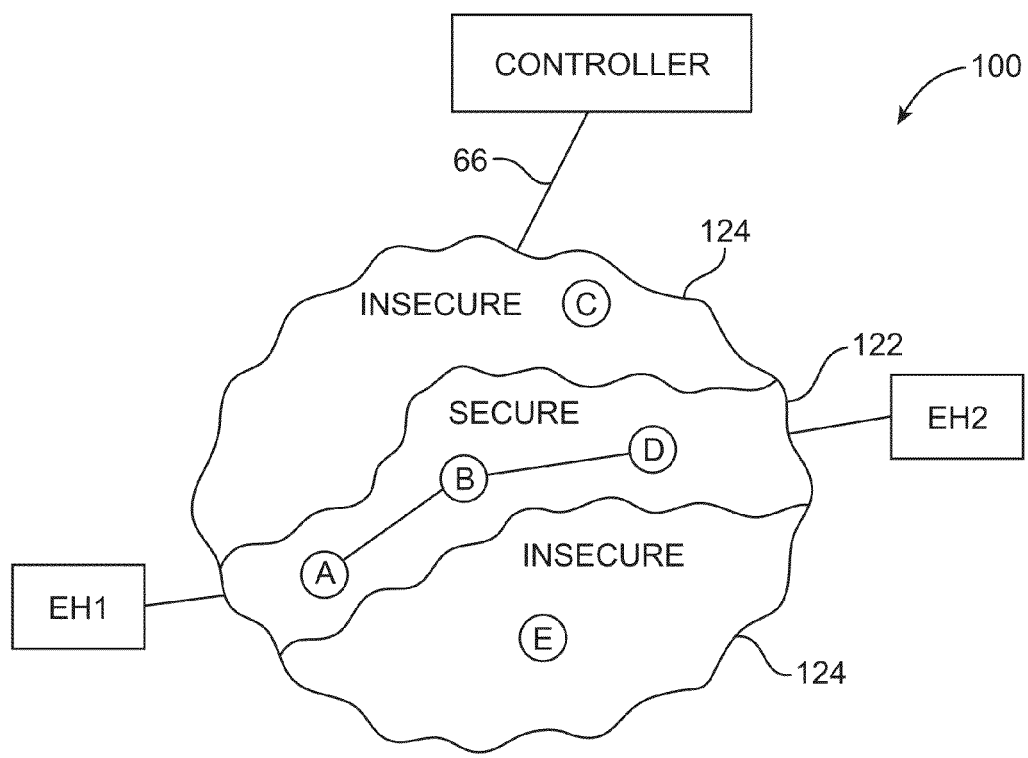
FIG. 13 is a diagram of a network having secure and insecure portions in which a controller may generate forwarding paths that traverse either the secure or insecure portions in accordance with an embodiment of the present invention.

Controller 18 may determine which forwarding path to select from a directed acyclic graph based on network attributes and based on network topology information. FIG. 13 is an illustrative diagram, of a network 100 including secure and insecure portions. Controller 18 may identify secure network portions 122 based on capabilities of network switches. For example, controller 18 may determine that switches A, B, and D include security capabilities such as network packet encryption/decryption capabilities or other secure packet forwarding capabilities. Switches such as switches C and E may be unable to provide secure packet forwarding and may form insecure network portions 124.

In the scenario of FIG. 13, it may be desirable to route network packets between end hosts EH1 and EH2 along secure paths in the network (e.g., because data between end hosts EH1 and EH2 may contain sensitive information that should be isolated from other end hosts such as end host EH3). In this scenario, controller 18 may select a network forwarding path such as forwarding path I1 of FIG. 10 from directed acyclic graph 110 of FIG. 9. The selected network forwarding path may traverse only secure portions of network 100. Controller 18 may determine whether forwarding paths of a directed acyclic graph are secure or insecure by retrieving switch capabilities of each switch in the forwarding paths (as an example). Controller 18 may identify which network packets are secure based on information received from a user such as a network administrator. For example, controller 18 may receive information identifying a set of network attributes associated with network packets that should be forwarded along secure paths.

Figure 14A:
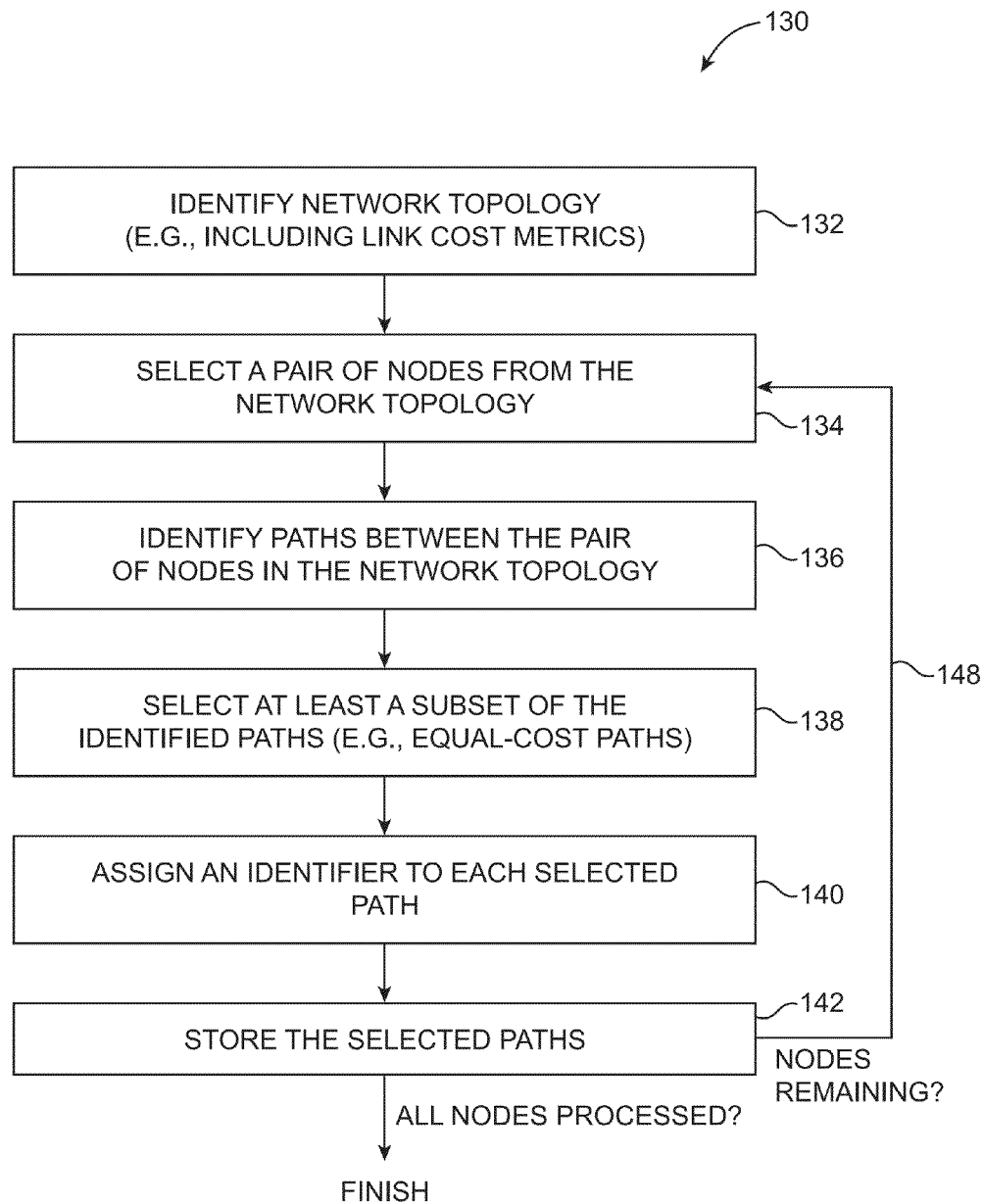
FIG. 14A is a flow chart of illustrative steps that may be performed by a controller to identify network paths based on network topology information and assign identifiers to the identified network paths in accordance with an embodiment of the present invention.

FIG. 14A is a flow chart 130 of illustrative steps that may be performed by a controller such as controller 18 to generate network topology information including multiple paths between network topology nodes (e.g., between switches). The network topology information may be generated for a packet forwarding network such as network 100 of FIG. 8.

During step 132, the controller may identify the network topology for the packet forwarding network. For example, the controller may identify client switches, end hosts that are coupled to the client switches, which switch ports the end hosts are coupled to, links between ports of the client switches, and other network topology information. Each switch may be represented by a node in the network topology, whereas links between switches may be represented by connections between nodes. The controller may determine cost metrics for links and/or nodes in the network topology. Each cost metric may describe a cost associated with forwarding network traffic through the corresponding link (or node). For example, the controller may determine cost metrics associated with links as shown in FIG. 8.

During step 134, the controller may select a pair of nodes from the network topology that have yet to be processed. For example, the controller may select switch A and switch B as shown in step 101 of FIG. 9. As another example, the controller may select switch A and switch D as shown in step 106 of FIG. 9.

During step 136, the controller may identify all available (possible) paths in the network topology between the selected pair of nodes. Zero or more paths may be identified during step 136. As an example, a single path between port P11 and P12 may be identified for switches A and B. As another example, multiple paths may be identified between switches A and D (e.g., a first path traversing switch B and a second path traversing switch C).

During step 138, the controller may select at least a subset of the identified paths for potential future implementation. The controller may select the subset based on cost metrics associated with links in the network topology. For example, equal-cost paths having minimum cost metric values may be selected. As another example, paths having cost metric values that are within a tolerance range of the path having the minimum cost metric value may be selected. These examples are merely illustrative. The controller may, if desired, select all paths between the selected pair of nodes during step 138. Non-selected paths may remain unused in future network operations (e.g., controller 18 may ignore or otherwise avoid implementing the non-selected paths).

During step 140, the controller may assign an identifier to each selected path between the pair of selected nodes. For example, the controller may index each path of the selected subset by assigning a corresponding integer identifier.

During step 142, the controller may store the selected paths. The selected paths may be stored in a database, table, or other suitable data structure and may be stored at the controller (e.g., at local storage such as local memory or disk-based storage). If network topology nodes remain to be processed, the process may return to step 134 via path 143 to select and process network paths associated with the remaining nodes. If all network topology nodes have been processed, the operations of flow chart 130 may be complete.

Figure 14B:
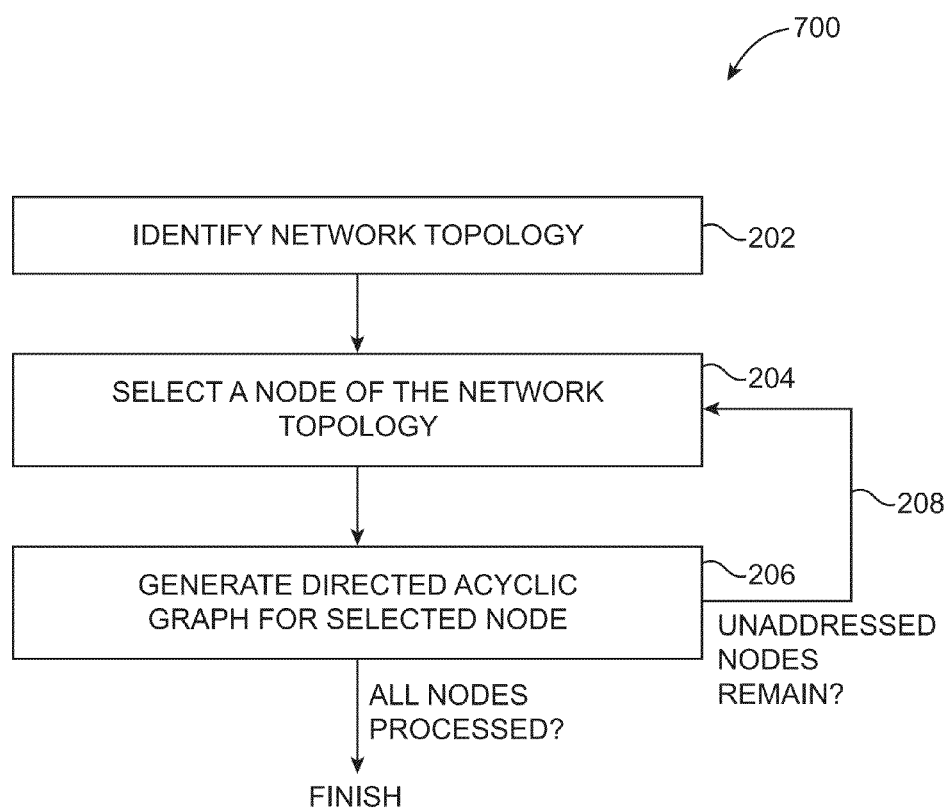
FIG. 14B is a flow chart of illustrative steps that may be perfomed by a controller to generate directed acyclic graphs based on network topology information in accordance with an embodiment of the present invention.

The example of FIG. 14A in which network paths are stored by the controller is merely illustrative. If desired, any data structure for a directed acyclic graph may be stored by the controller. FIG. 14B is a flow chart 200 of illustrative steps that may be performed by a controller to generate a directed acyclic graph for a network.

During step 202, the controller may identify the network topology of the network (e.g., similar to step 132 of FIG. 14A. During subsequent step 204, the controller may select a node of the network topology. The selected node may serve as a source node that is used to generate a directed acyclic graph for the selected node during step 206. For example, the controller may perform steps 101-108 of FIG. 9 to generate a directed acyclic graph in the scenario that switch A is selected during step 204 as a source node. The directed acyclic graph may be stored by the controller for future use in generating network forwarding paths. The process may then return to step 204 to generate directed acyclic graphs for any unprocessed nodes that remain. If all nodes of the network topology have been processed, the operations of flow chart 200 may be complete.

Figure 15:
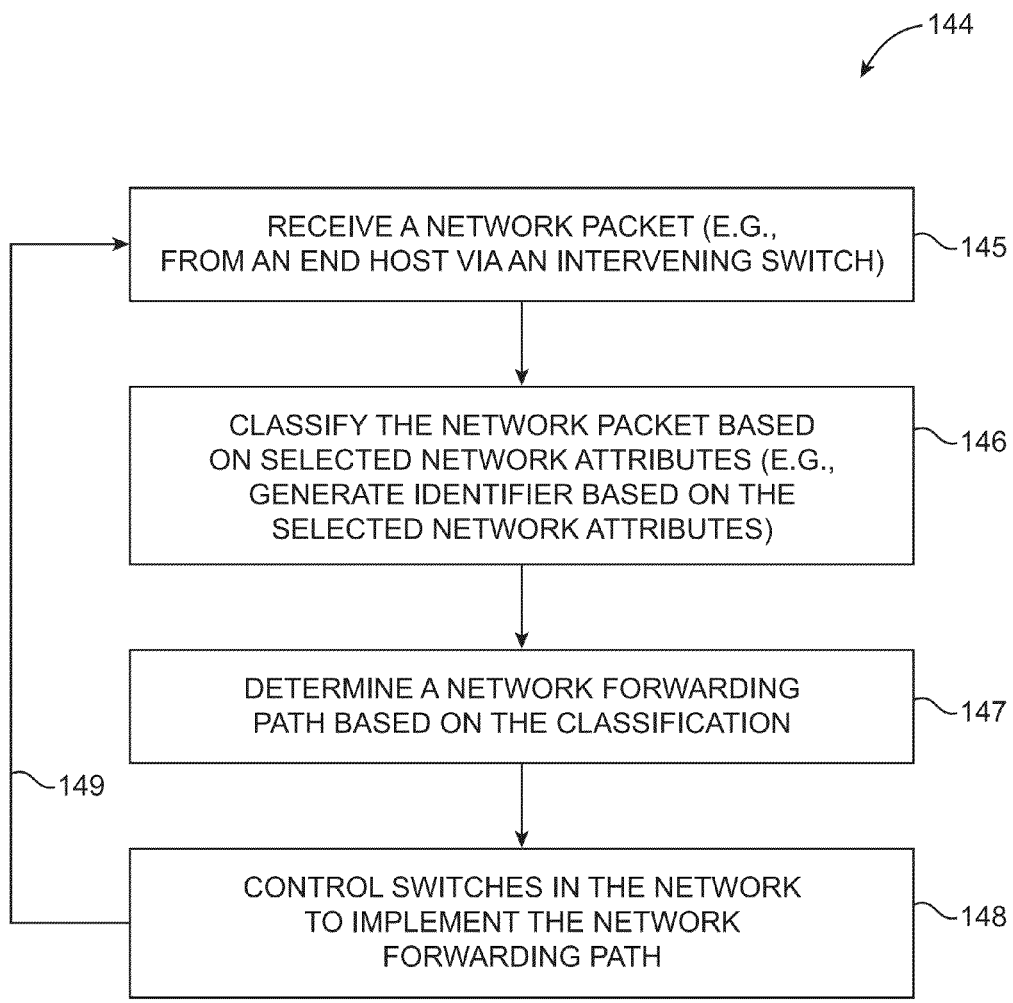
FIG. 15 is a flow chart of illustrative steps that may be performed by a controller to determine a network forwarding path for a network packet by classifying the network packet in accordance with an embodiment of the present invention.

A controller may select and implement forwarding paths for network packets based on indexed forwarding paths (e.g., forwarding paths that have been assigned identifiers). FIG. 15 is a flow chart 144 of illustrative steps that may be performed by a controller such as controller 18 to select from indexed forwarding paths.

During step 145, the controller may receive a network packet. The network packet may have been sent by an end host and received at a client switch. The client switch may forward the network packet to the controller along with switch information such as information identifying which port the network packet was received at.

During step 146, the controller may classify the network packet based on selected network attributes associated with the network packet. The network attributes may be a subset of network attribute information available or maintained by the controller. For example, the network attributes may include one or more packet headers retrieved from the network packet, may include attachment point information, may include virtual switch information, other network attributes, or combinations of these network attributes. The controller may generate an identifier for the network packet based on the selected network attributes. The identifier may be generated based on a deterministic function that maps sets of network attributes to corresponding identifiers. Consider the scenario in which the destination IP address header field is selected for classifying network packets. In this scenario, a deterministic function may map destination IP addresses to corresponding identifiers (e.g., a first set of one or more destination IP addresses may be mapped to identifier I1 of FIG. 10, whereas a second set of one or more destination IP addresses may be mapped to identifier I2).

If desired, the network attributes used in classifying the network packet may be user-determined (e.g., a network administrator may specify sets of one or more network attributes that should be used in classifying the network packet). If desired, the function used to map network attributes to identifiers may be defined by a user (e.g., the user may configure the controller to implement a desired function).

During step 147, the controller may determine a network forwarding path based on the identifier generated during step 146. The network forwarding path may be determined by matching the identifier to paths that have been stored or otherwise previously identified by the controller. For example, the controller may identify a source end host and a destination end host from the network attributes of the network packet. In this scenario, the controller may identify source and destination switches that are respectively coupled to the source and destination end hosts. The controller may compare the identifier of the network packet to the identifiers of all stored paths between the source and destination switches. This example is merely illustrative. If desired, a directed acyclic graph such as generated during the operations of flow chart 200 of FIG. 14B may be used during step 147 to generate the network forwarding path. For example, the controller may retrieve a directed acyclic graph that was previously generated for the source or destination switch and identify all available paths between the source and destination using the directed acyclic graph. In this scenario, each path may be indexed and compared with the identifier of the network packet. The stored path that matches the identifier of the network packet may be selected.

During step 148, the controller may control the switches in the network to implement the selected network forwarding path. For example, the controller may provide flow table entries such as flow table entries 68 of FIG. 6A to the switches that direct the switches to forward the network packet along the selected network forwarding path. The process may then return to step 142 via path 149 to generate network forwarding paths for additional network packets with different network attributes.

By performing the operations of steps 140-148, controller 18 may more efficiently utilize available network resources. In scenarios such as when multiple network paths exist between source and destination switches, controller 18 may partition network traffic flowing between the source and destination switches based on network attributes of the network traffic (e.g., by implementing network forwarding paths for portions of the network traffic based on identifiers that are generated based on the network attributes of each portion). In addition, network packets of each network traffic flow may be consistently forwarded along the corresponding forwarding path.

Figure 16:
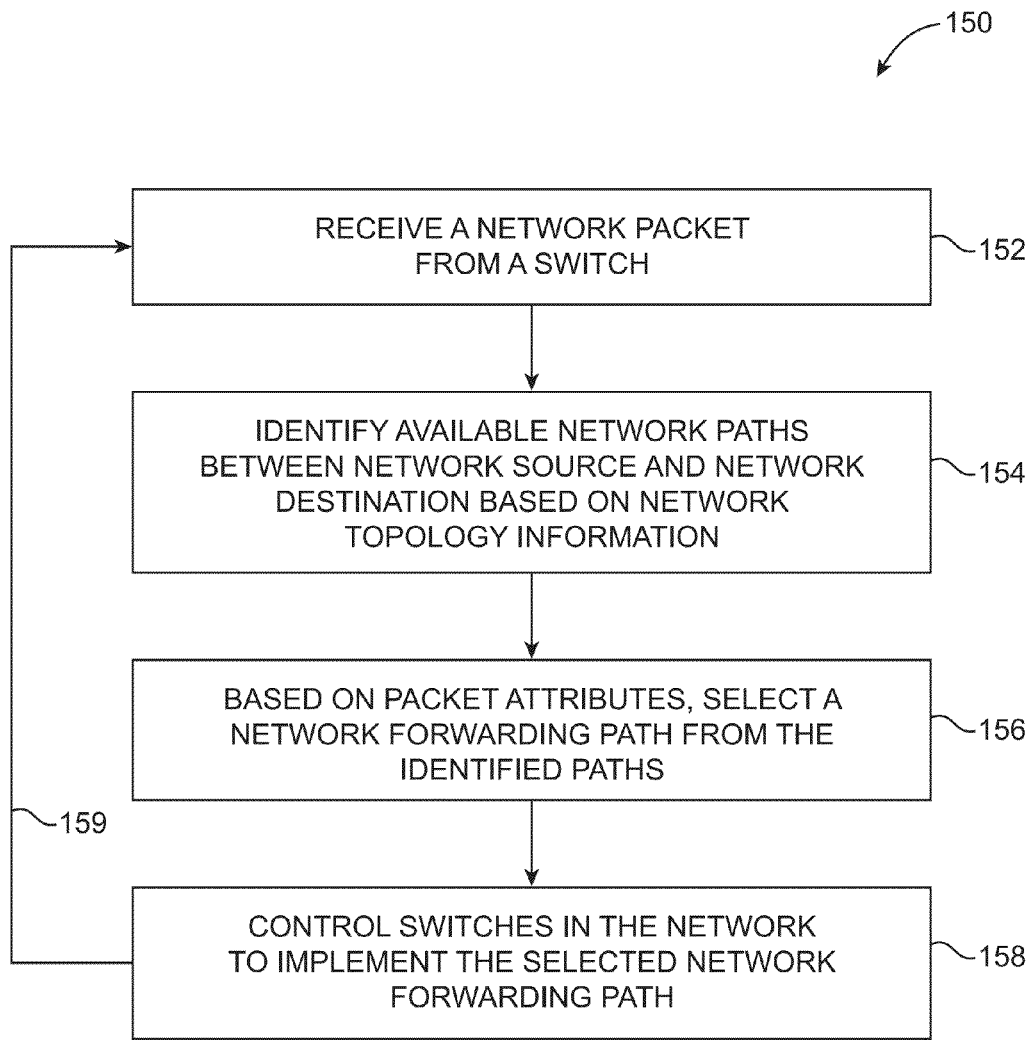
FIG. 16 is a flow chart of illustrative steps that may be performed by a controller to select a network forwarding path for a network packet from available forwarding paths in accordance with an embodiment of the present invention.

The example of FIG. 15 in which the controller determines network forwarding paths by computing an identifier is merely illustrative. In general, the controller may determine network forwarding paths based on stored forwarding paths and network attributes associated with network packets. FIG. 16 is a flow chart 150 of illustrative steps that may be performed by a controller such as controller 18 to directly select from available network forwarding paths based on network attributes of a network packet.

During step 152, the controller may receive a network packet from a switch (e.g., similar to step 142 of FIG. 15). The controller may identify a network source and a network destination based on the network packet (e.g., source and destination end hosts and/or source and destination switches).

During step 154, the controller may identify available network forwarding paths between the network source and the network destination. The available network forwarding paths may be identified based on network topology information maintained by the controller. For example, the controller may maintain a database of available paths between each pair of nodes in a network topology, which may be a subset of all possible paths as determined using cost metrics and a directed acyclic graph as shown in FIG. 9 and FIG. 10. In this scenario, the controller may retrieve the available paths between the network source and network destination from the database.

During step 156, the controller may select a network forwarding path from the paths identified during step 154. The controller may select a network forwarding path based on packet attributes of the network packet (e.g., one or more packet header fields or network attributes maintained at the controller such as which virtual switch the network packet belongs to). If desired, the controller may select the network forwarding path based partly on current network traffic conditions and/or to balance network traffic flows among the available network forwarding paths. The controller may generate the forwarding path while ensuring forwarding path consistency for types (classes) of network packets. For example, the controlled may classify the network packet similarly to step 144 of FIG. 15 and ensure that the same network forwarding path is formed for different network packets of the same class.

During step 158, the controller may control the switches in the network to implement the selected network forwarding path (e.g., similarly to step 148 of FIG. 15). The process may subsequently return to step 152 via path 159 to generate network forwarding paths for additional network packets.

The foregoing is merely illustrative of the principles of this invention and various modifications can be made by those skilled in the art without departing from the scope and spirit of the invention.

What is claimed is:

1. A method of using a controller that controls switches in a network, the method comprising:
    with the controller, receiving a network packet;
    generating an identifier based on network attributes of the network packet;
    based on the identifier, determining a network forwarding path for the network packet;
    with the controller, maintaining network topology information for the network;
    generating a directed acyclic graph based on the network topology information, wherein the switches include ports; and
    generating a plurality of virtual switches, wherein at least one virtual switch of the plurality of virtual switches includes ports from multiple switches, wherein generating the identifier based on the network attributes of the network packet comprises:
        identifying which virtual switch of the plurality of virtual switches is associated with the network packet; and
        generating the identifier based on the identified virtual switch.

2. The method defined in claim 1 further comprising:
    identifying source and destination switches from the network packet, wherein the directed acyclic graph includes a set of at least one forwarding path between the source and destination switches.

3. The method defined in claim 2 wherein determining the network forwarding path for the network packet comprises:
    selecting a forwarding path from the set based on the identifier.

4. The method defined in claim 3 wherein the set of at least one forwarding path between the source and destination switches includes a plurality of forwarding paths between the source and destination switches.

5. The method defined in claim 4 wherein the plurality of forwarding paths between the source and destination switches comprises a plurality of equal-cost forwarding paths.

6. The method defined in claim 4 further comprising:
    assigning indices to the plurality of forwarding paths between the source and destination switches, wherein generating the identifier comprises generating an integer value, and wherein selecting the forwarding path from the set based on the identifier comprises matching the integer value to the indices of the plurality of forwarding paths.

7. The method defined in claim 1 further comprising:
    generating the network forwarding path by providing flow table entries to the switches.

8. The method defined in claim 1 wherein generating the identifier based on the network attributes of the network packet comprises:
    retrieving packet header information from the network packet; and
    generating the identifier based on the retrieved packet header information.

9. The method defined in claim 8 wherein retrieving packet header information from the network packet comprises retrieving a destination network address from the network packet.

10. The method defined in claim 8 wherein retrieving packet header information from the network packet comprises retrieving a virtual local area network identifier from the network packet.

11. The method defined in claim 1 wherein the network packet includes data that is sent between end hosts of the network and wherein generating the identifier comprises generating the identifier based at least partly on the data of the network packet.

12. A method of using a controller that controls switches in a network, the method comprising:
- with the controller, selecting first and second switches of the network;
- with the controller, selecting a plurality of forwarding paths between the first and second switches;
- with the controller, assigning an identifier to each selected path;
- with the controller, controlling the switches to generate a forwarding path of the plurality of forwarding paths based on the assigned identifiers, wherein the switches include ports; and
- generating a plurality of virtual switches, wherein at least one virtual switch of the plurality of virtual switches includes ports from multiple switches, wherein assigning the identifier comprises:
  - identifying which virtual switch of the plurality of virtual switches is associated with a network packet received by the controller; and
  - generating the identifier based on the identified virtual switch.

13. The method defined in claim 12 further comprising:
- with the controller, identifying all forwarding paths between the first and second switches based on network topology information maintained at the controller, wherein selecting the plurality of forwarding paths between the first and second switches comprises selecting a subset of the identified forwarding paths.

14. The method defined in claim 13 further comprising:
- with the controller, calculating a cost metric for each forwarding path between the first and second switches, wherein selecting the subset of the identified forwarding paths between the first and second switches comprises:
  - determining which forwarding paths of the identified forwarding paths are minimum-cost forwarding paths.

15. The method defined in claim 13 further comprising:
- with the controller, receiving the network packet;
- with the controller, identifying network attributes associated with the network packet; and
- with the controller, calculating a network packet identifier based on the identified network attributes, wherein the forwarding path has an identifier that matches the network packet identifier.

16. The method defined in claim 12, further comprising:
- with the controller, maintaining network topology information for the network.

17. A method of using a controller that controls switches in a network, the method comprising:
- with the controller, identifying network topology information for the network;
- based on the network topology information, generating a directed acyclic graph including nodes corresponding to the switches and including directed edges between the nodes using the controller;
- with the controller, receiving and classifying a network packet to produce a classification based on network attributes associated with the network packet;
- with the controller, controlling the switches to generate a network forwarding path for the network packet based on the directed acyclic graph and the classification of the network packet, wherein the switches include ports; and
- generating a plurality of virtual switches, wherein at least one virtual switch of the plurality of virtual switches includes ports from multiple switches, and wherein classifying the network packet comprises generating an identifier based on the network attributes associated with the network packet comprises:
  - identifying which virtual switch of the plurality of virtual switches is associated with the network packet; and
  - generating the identifier based on the identified virtual switch.

18. The method defined in claim 17 further comprising:
- with the controller, identifying a network source and network destination from the network packet, wherein the directed acyclic graph includes a plurality of paths between the network source and network destination and wherein generating the network forwarding path based on the directed acyclic graph and the classification comprises:
  - based on the classification of the network packet, selecting a path from the plurality of paths between the network source and network destination; and
  - controlling the switches to generate the selected path.

* * * * *